United States Patent
Kodialam et al.

(10) Patent No.: US 9,807,019 B2
(45) Date of Patent: Oct. 31, 2017

(54) OFFLINE OPTIMIZATION FOR TRAFFIC ENGINEERING WITH SEGMENT ROUTING

(71) Applicant: ALCATEL-LUCENT USA, INC., Murray Hill, NJ (US)

(72) Inventors: Murali Kodialam, Marlboro, NJ (US); Randeep Bhatia, Green Brook, NJ (US); Fang Hao, Morganville, NJ (US); T. V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 161 days.

(21) Appl. No.: 14/672,782

(22) Filed: Mar. 30, 2015

(65) Prior Publication Data

US 2016/0294702 A1 Oct. 6, 2016

(51) Int. Cl.
*H04L 12/801* (2013.01)
*H04L 12/28* (2006.01)
*H04L 12/24* (2006.01)
*H04L 12/26* (2006.01)
*H04L 12/751* (2013.01)
*H04L 12/729* (2013.01)
(Continued)

(52) U.S. Cl.
CPC .............. *H04L 47/18* (2013.01); *H04L 12/28* (2013.01); *H04L 41/0695* (2013.01); *H04L 43/16* (2013.01); *H04L 45/08* (2013.01); *H04L 45/125* (2013.01); *H04L 45/14* (2013.01); *H04L 45/38* (2013.01); *H04L 45/50* (2013.01); *H04L 41/0654* (2013.01); *H04L 41/12* (2013.01); *H04L 41/142* (2013.01); *H04L 45/24* (2013.01); *H04L 45/42* (2013.01); *H04L 47/125* (2013.01); *H04L 69/166* (2013.01)

(58) Field of Classification Search
CPC ......... H04L 47/18; H04L 45/50; H04L 12/28; H04L 41/0695; H04L 43/16; H04L 45/14; H04L 45/125; H04L 45/38; H04L 45/08; H04L 41/142; H04L 45/24; H04L 41/12; H04L 41/0654; H04L 47/125; H04L 45/42; H04L 69/166
See application file for complete search history.

(56) References Cited

U.S. PATENT DOCUMENTS

| | | |
|---|---|---|
| 6,831,895 B1 | 12/2004 | Ji et al. |
| 7,363,386 B1 | 4/2008 | Nucci et al. |

(Continued)

FOREIGN PATENT DOCUMENTS

EP 1604143 A1 11/2005

OTHER PUBLICATIONS

Software-Defined networking : the new norm for networks, Open Networking Foundation, 2012.
(Continued)

*Primary Examiner* — Brian O'Connor
(74) *Attorney, Agent, or Firm* — Kramer & Amado, P.C.

(57) ABSTRACT

Various exemplary embodiments relate to a method of offline traffic matrix aware segment routing. The method may include receiving a traffic matrix based upon all the traffic between nodes i and j that is routed in the network; and determining the amount of traffic between nodes i and j will be routed through node k, based on minimizing a maximum link utilization for the traffic matrix by determining that the total amount of flow on a link e in the network is less than the link's capacity.

21 Claims, 8 Drawing Sheets

(51) Int. Cl.

| | | |
|---|---|---|
| *H04L 12/721* | (2013.01) | |
| *H04L 12/723* | (2013.01) | |
| H04L 12/707 | (2013.01) | |
| H04L 12/717 | (2013.01) | |
| H04L 12/803 | (2013.01) | |
| H04L 29/06 | (2006.01) | |

(56) References Cited

U.S. PATENT DOCUMENTS

| | | | |
|---|---|---|---|
| 7,558,209 B2 | 7/2009 | Kodialam | |
| 7,609,626 B2 | 10/2009 | Wang et al. | |
| 7,869,359 B2* | 1/2011 | Kohler | H04L 45/12 370/231 |
| 7,957,266 B2 | 6/2011 | Kodialam | |
| 8,027,245 B2* | 9/2011 | Kodialam | H04L 45/04 370/216 |
| 8,194,535 B2* | 6/2012 | Kodialam | H04L 45/04 370/217 |
| 8,559,308 B2 | 10/2013 | Imai et al. | |
| 8,611,232 B2* | 12/2013 | Xu | H04L 45/24 370/225 |
| 8,787,400 B1 | 7/2014 | Barth et al. | |
| 9,225,591 B2* | 12/2015 | Beheshti-Zavareh | H04L 45/64 |
| 2003/0099194 A1 | 5/2003 | Lee | |
| 2003/0185153 A1 | 10/2003 | Kohler | |
| 2003/0227877 A1 | 12/2003 | Kar | |
| 2005/0271060 A1 | 12/2005 | Kodialam | |
| 2007/0177506 A1* | 8/2007 | Singer | H04L 45/38 370/235 |
| 2007/0253403 A1 | 11/2007 | Kodialam | |
| 2007/0258508 A1 | 11/2007 | Werb | |
| 2007/0263592 A1 | 11/2007 | Agarwal et al. | |
| 2010/0074103 A1 | 3/2010 | Menth | |
| 2013/0028073 A1* | 1/2013 | Tatipamula | H04L 41/12 370/218 |
| 2013/0028142 A1* | 1/2013 | Beheshti-Zavareh | H04L 45/22 370/255 |

OTHER PUBLICATIONS

Applegate, et al., "Making Intra-Domain Routing Robust to Changing and Uncertain Trafc Demands: Understanding Fundamental Tradeoffs", SIGCOMM, 2003, 313-324.

Awduche, "Overview and Principles of Internet Traffic Engineering", IETF, RFC 3272, 2003, 313-324.

Farrel, et al., "A Path Computation Element (PCE)-Based Architecture", IETF, RFC 4655, Aug. 2006.

Filfils, et al., "Segment Routing Architecture", IETF Internet Draft, Dec. 2013.

Filfils, et al., "Segment Routing with MPLS data plane", IETF Internet Draft, Apr. 2014.

Garg, et al., "Faster and simpler algorithms for multicommodity flow and other fractional packing problems", SIAM Journal on Computing 37(2), 2007, 630-652.

Hopps, "Analysis of an Equal-Cost Multi-Path Algorithm", IETF, RFC 2992, Nov. 2000.

N. Buchbinder, et al., "A Primal-Dual Approach to Online Routing and Packing", 47th IEEE Foundations on Computer Science, 2006.

N. Buchbinder, et al., "Online Primal-Dual Algorithms for Covering and Packing Problems", 13th Annual European Symposium on Algorithms, 2005.

International Search Report with Written Opinion dated Jun. 13, 2016 for International Application No. PCT/US2016/023448.

Kodialam, et al., "Traffic-Oblivious Routing in the Hose Model", IEEE / ACM Transactions on Networking; vol. 19, No 3., Jun. 1, 2011, 774-787.

Randeep, et al., "Optimized Network Traffic Engineering Using Segment Routing", IEEE Conference Proceedings; The Institute of Electrical and Electronics Engineers, Inc., Apr. 1, 2015, 657.

* cited by examiner

600

Online Segment Routing:

- Initialize $\theta(l) \leftarrow 0 \ \forall l \in E$.

- At arrival $r$

1) Compute $V = \min_k \sum_l g_r^k(l) \theta(l)$
  2) If $V > 1$ then reject request $r$.
  3) If $V \leq 1$ then accept the demand and a) Let
     $$k^* = \arg \min_k \sum_l g_r^k(l) \theta(e).$$

b) Set
     $$\pi(r) \leftarrow d(r) \left[ 1 - \sum_l g_r^{k^*}(l) \theta(l) \right].$$

c) Set for all links $e$
     $$\theta(l) \leftarrow \theta(l) \left[ 1 + \frac{\sum g_r^{k^*}(l) d(r)}{c(l)} \right] + \frac{1}{n(e-1)} \frac{\sum g_r^{k^*}(l) d(r)}{c(l)}$$

FIG. 6

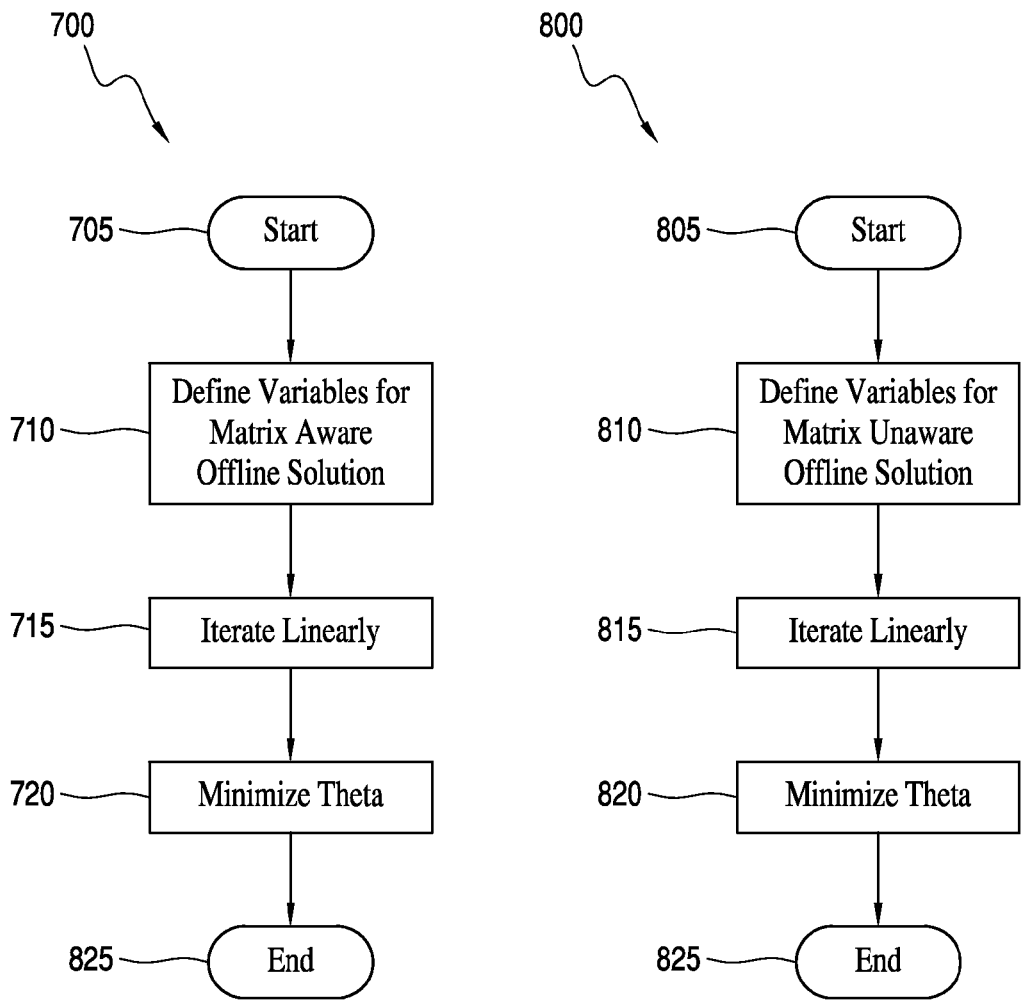

OFFLINE OPTIMIZATION FOR TRAFFIC ENGINEERING WITH SEGMENT ROUTING

TECHNICAL FIELD

Various exemplary embodiments disclosed herein relate generally to computer networking, and more particularly to internet routing.

BACKGROUND

Traditional routing in Internet Protocol (IP) networks is often along shortest paths using link weight as the metric. It has been observed that under some traffic conditions, shortest path routing may lead to congestion on some links in the network while capacity may be available elsewhere in the network. Segment Routing is a new Internet Engineering Task Force (IETF) protocol to address this problem. The key idea in segment routing is to break up the routing path into segments in order to enable better network utilization. Segment routing may also enable finer control of the routing paths. It may also be used to route traffic through middle boxes.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments are described including a method of offline traffic matrix aware segment routing including: determining all the traffic between nodes i and j that is routed in the network; and based on minimizing the maximum link utilization for the traffic matrix determining that the total amount of flow on a link e in the network is less than the links capacity.

Various exemplary embodiments are described wherein the amount of traffic between i and j that may be routed through node k is positive.

Various exemplary embodiments are described wherein he total amount of traffic through a node k between nodes i and j is equal to or greater than the traffic between i and j.

Various exemplary embodiments are described wherein the sum of the flow that results on link e when a unit flow is routed from i to j through intermediate node k multiplied by the sum of the amount of traffic between i and j that may be routed through node k, is less than the maximum link utilization.

Various exemplary embodiments are described of offline traffic matrix aware segment routing further including: using a linear program to minimize the maximum link utilization for the traffic matrix, wherein: the sum of traffic between i and j that may be routed through node k is more than or equal to the traffic between nodes i and j the sum of the flow that results on link e when a unit flow is routed from i to j through intermediate node k multiplied by the sum of the amount of traffic between i and j that may be routed through node k, is less than the maximum link utilization; and the amount of traffic between i and j that may be routed through node k is positive.

Various exemplary embodiments are described wherein the linear program minimizes theta for the following set of equations:

$$\sum_k x_{ij}^k \geq t_{ij} \forall (ij) \sum_{ij} \sum_k g_{ij}^k(e) x_{ij}^k \leq \theta c(e) \forall e \, x_{ij}^k \geq 0 \forall (ij)$$

where $t_{ij}$ denotes the traffic between nodes i and j, $x_{ij}^k$ denotes the amount of traffic between i and j that may be routed through node k, $g_{ij}^k(e)$ denotes the flow that results on link e if a unit flow may be routed from i to j through intermediate node k, c(e) denotes the capacity of link e, theta denotes the maximum link utilization.

Various exemplary embodiments are described including a device for offline traffic matrix aware segment routing, the device including: a memory; a processor configured to: determine all the traffic between nodes i and j that is routed in the network; and based on a minimization of the maximum link utilization for the traffic matrix, determine that the total amount of flow on a link, e in the network is less than the links capacity based on.

Various exemplary embodiments are described wherein the amount of traffic between i and j that may be routed through node k is positive.

Various exemplary embodiments are described wherein the total amount of traffic through a node k between nodes i and j is equal to or greater than the traffic between i and j.

Various exemplary embodiments are described wherein the sum of the flow that results on link e when a unit flow is routed from i to j through intermediate node k multiplied by the sum of the amount of traffic between i and j that may be routed through node k, is less than the maximum link utilization Various exemplary embodiments are described where the offline traffic matrix aware segment routing further including using a linear program to minimize the maximum link utilization for the traffic matrix, wherein: the sum of traffic between i and j that may be routed through node k is more than or equal to the traffic between nodes i and j the sum of the flow that results on link e when a unit flow is routed from i to j through intermediate node k multiplied by the sum of the amount of traffic between i and j that may be routed through node k, is less than the maximum link utilization; and the amount of traffic between i and j that may be routed through node k is positive.

Various exemplary embodiments are described wherein the linear program minimizes theta for the following set of equations:

$$\sum_k x_{ij}^k \geq t_{ij} \forall (ij) \sum_{ij} \sum_k g_{ij}^k(e) x_{ij}^k \leq \theta c(e) \forall e \, x_{ij}^k \geq 0 \forall (ij)$$

where $t_{ij}$ denotes the traffic between nodes i and j, $x_{ij}^k$ denotes the amount of traffic between i and j that may be routed through node k, $g_{ij}^k(e)$ denotes the flow that results on link e if a unit flow may be routed from i to j through intermediate node k, c(e) denotes the capacity of link e, theta denotes the maximum link utilization.

Various exemplary embodiments are described including a non-transitory machine-readable storage medium encoded with instructions for execution of a method of offline traffic matrix aware segment routing, the medium including: instructions for determining all the traffic between nodes i and j that is routed in the network; and based on minimizing the maximum link utilization for the traffic matrix determining that the total amount of flow on a link e in the network is less than the links capacity.

Various exemplary embodiments are described wherein the amount of traffic between i and j that may be routed through node k is positive.

Various exemplary embodiments are described wherein the total amount of traffic through a node k between nodes i and j is equal to or greater than the traffic between i and j.

Various exemplary embodiments are described wherein the sum of the flow that results on link e when a unit flow is routed from i to j through intermediate node k multiplied by the sum of the amount of traffic between i and j that may be routed through node k, is less than the maximum link utilization Various exemplary embodiments are described including instructions for using a linear program to minimize the maximum link utilization for the traffic matrix, wherein: the sum of traffic between i and j that may be routed through node k is more than or equal to the traffic between nodes i and j the sum of the flow that results on link e when a unit flow is routed from i to j through intermediate node k multiplied by the sum of the amount of traffic between i and j that may be routed through node k, is less than the maximum link utilization; and the amount of traffic between i and j that may be routed through node k is positive The non-transitory machine-readable storage medium of claim wherein the linear program minimizes theta for the following set of equations:

$$\sum_k x_{ij}^k \ge t_{ij} \forall (ij) \sum_{ij}\sum_k g_{ij}^k(e)x_{ij}^k \le \theta c(e) \forall e x_{ij}^k \ge 0 \forall (ij)$$

where $t_{ij}$ denotes the traffic between nodes i and j, $x_{ij}^k$ denotes the amount of traffic between i and j that may be routed through node k, $g_{ij}^k(e)$ denotes the flow that results on link e if a unit flow may be routed from i to j through intermediate node k, c(e) denotes the capacity of link e, theta denotes the maximum link utilization.

Various exemplary embodiments are described including a method of offline traffic matrix unaware segment routing including: using a linear program to minimize the maximum link utilization over all traffic matrices considering a link e and e' which are utilized in a dual variable π(e, e') constraint which is greater than or equal to zero; and determining when the amount of traffic between a node i and a node j that flows on link e' through intermediate node k is less than or equal to the fraction of traffic that flows on link e if one unit of flow is sent from source i to destination j through an intermediate node m subject to dual variable π(e,e').

Various exemplary embodiments are described wherein the fraction of traffic from i to j that is routed through intermediate node k is greater than or equal to zero.

Various exemplary embodiments are described wherein the total traffic from i to j that is routed through intermediate node k is equal to 1 for all (i,j) pairs.

Various exemplary embodiments are described further including: determining when the total capacity for link e as constrained by the dual variable is less than or equal to the capacity, c of link e' for all e'.

Various exemplary embodiments are described wherein the linear program minimizes theta for the following set of equations:

$$\sum_e g_{ij}^m(e)\pi(e,e') \ge \sum_k g_{ij}^k(e')\alpha_{ij}^k \forall (ij) \forall e' \forall m \sum_e c(e)\pi(e,e') \le \theta c(e') \forall e' \sum_k \alpha_{ij}^k = 1 \forall (ij);$$

and $\alpha_{ij}^k, \pi(e,e') \ge 0$ ∀e,e', where a link e and e' are utilized in dual variable π(e,e'), g indicates the amount of traffic between a node i and a node j that flows on link e' through intermediate node k, and $\alpha_{ij}^k$ is the fraction of traffic from i to j that is routed through intermediate node k.

Various exemplary embodiments are described, wherein the linear program minimizes theta for the following set of equations:

$$\sum_e g_{ij}^m(e)\pi(e,e') \ge \sum_k g_{ij}^k(e')\alpha_{ij}^k \forall (ij) \forall e' \forall m \sum_k \alpha_{ij}^k = 1 \forall (ij);$$

and $\alpha_{ij}^k, \pi(e,e') \ge 0$ ∀ (ij) ∀e,e', where a link e and e' are utilized in dual variable π(e, e'), g indicates the amount of traffic between a node i and a node j that flows on link e' through intermediate node k, and $\alpha_{ij}^k$ is the fraction of traffic from i to j that is routed through intermediate node k.

Various exemplary embodiments are described including a device for offline traffic matrix unaware segment routing, the device including: a memory; a processor configured to: use a linear program to minimize the maximum link utilization over all traffic matrices considering a link e and e' which are utilized in a dual variable π(e,e') constraint which is greater than or equal to zero; and determine when the amount of traffic between a node i and a node j that flows on link e' through intermediate node k is less than or equal to the fraction of traffic that flows on link e if one unit of flow is sent from source i to destination j through an intermediate node m subject to dual variable π(e,e').

Various exemplary embodiments are described wherein the fraction of traffic from i to j that is routed through intermediate node k is greater than or equal to zero.

Various exemplary embodiments are described wherein the total traffic from i to j that is routed through intermediate node k is equal to 1 for all (i,j) pairs.

Various exemplary embodiments are described wherein the processor is further configured to: determine when the total capacity for link e as constrained by the dual variable is less than or equal to the capacity, c of link e' for all e'.

Various exemplary embodiments are described wherein the linear program minimizes theta for the following set of equations:

$$\sum_e g_{ij}^m(e)\pi(e,e') \ge \sum_k g_{ij}^k(e')\alpha_{ij}^k \forall (ij) \forall e' \forall m \sum_e c(e)\pi(e,e') \le \theta c(e') \forall e' \sum_k \alpha_{ij}^k = 1 \forall (ij)$$

and $\alpha_{ij}^k, \pi(e,e') \ge 0$ ∀ (ij) ∀e,e', where a link e and e' are utilized in dual variable π(e,e'), g indicates the amount of traffic between a node i and a node j that flows on link e' through intermediate node k, and $\alpha_{ij}^k$ is the fraction of traffic from i to j that is routed through intermediate node k.

Various exemplary embodiments are described wherein the linear program minimizes theta for the following set of equations:

$$\sum_e g_{ij}^m(e)\pi(e, e') \geq \sum_k g_{ij}^k(e')\alpha_{ij}^k \forall (ij) \forall e' \forall m \sum_e c(e)\pi(e, e') \leq$$

$$\theta c(e') \forall e' \sum_k \alpha_{ij}^k = 1 \forall (ij);$$

$\alpha_{ij}^k, \pi(e,e') \geq 0$ ∀ (ij) ∀e,e', where a link e and e' are utilized in dual variable $\pi(e,e')$, g indicates the amount of traffic between a node i and a node j that flows on link e' through intermediate node k, and $\alpha_{ij}^k$ is the fraction of traffic from i to j that is routed through intermediate node k.

Various exemplary embodiments are described including a non-transitory machine-readable storage medium encoded with instructions for execution of a method of offline traffic matrix unaware segment routing, the medium including: instructions for using a linear program to minimize the maximum link utilization over all traffic matrices considering a link e and e' which are utilized in a dual variable $\pi(e, e')$ constraint which is greater than or equal to zero; and instructions for determining when the amount of traffic between a node i and a node j that flows on link e' through intermediate node k is less than or equal to the fraction of traffic that flows on link e if one unit of flow is sent from source i to destination j through an intermediate node m subject to dual variable $\pi(e,e')$. The non-transitory machine-readable storage medium, wherein the fraction of traffic from i to j that is routed through intermediate node k is greater than or equal to zero. The non-transitory machine-readable storage medium, wherein the total traffic from i to j that is routed through intermediate node k is equal to 1 for all (i,j) pairs.

Various exemplary embodiments are described further including: instructions for determining when the total capacity for link e as constrained by the dual variable is less than or equal to the capacity, c of link e' for all e'. The non-transitory machine-readable storage medium, wherein the linear program minimizes theta for the following set of equations:

$$\sum_e g_{ij}^m(e)\pi(e, e') \geq \sum_k g_{ij}^k(e')\alpha_{ij}^k \forall (ij) \forall e' \forall m \sum_e c(e)\pi(e, e') \leq$$

$$\theta c(e') \forall e' \sum_k \alpha_{ij}^k = 1 \forall (ij);$$

and $\alpha_{ij}^k, \pi(e,e') \geq 0$ ∀ (ij) ∀e,e', where a link e and e' are utilized in dual variable $\pi(e,e')$, g indicates the amount of traffic between a node i and a node j that flows on link e' through intermediate node k, and $\alpha_{ij}^k$ is the fraction of traffic from i to j that is routed through intermediate node k.

Various exemplary embodiments are described wherein the linear program minimizes theta for the following set of equations:

$$\sum_e g_{ij}^m(e)\pi(e, e') \geq \sum_k g_{ij}^k(e')\alpha_{ij}^k \forall (ij) \forall e' \forall m \sum_e c(e)\pi(e, e') \leq$$

$$\theta c(e') \forall e' \sum_k \alpha_{ij}^k = 1 \forall (ij);$$

and $\alpha_{ij}^k, \pi(e,e') \geq 0$ ∀ (ij)∀e,e', where a link e and e' are utilized in dual variable $\pi(e,e')$, g indicates the amount of traffic between a node i and a node j that flows on link e' through intermediate node k, and $\alpha_{ij}^k$ is the fraction of traffic from i to j that is routed through intermediate node k.

Various exemplary embodiments are described including a method of online segment routing including: initializing a link l's dual weight to zero for each arrival: determining the minimum weight two segment path from the ingress to egress for the demand; and when the minimum weight path has a weight less than or equal to one, route the demand along the minimum weight path.

Various exemplary embodiments are described wherein routing the demand further comprises: assigning the minimum of the flow on link l when a request r is routed through intermediate node k.

Various exemplary embodiments are described wherein routing the demand further comprises: ensuring the minimum of the flow is dual feasible.

Various exemplary embodiments are described wherein routing the demand further comprises: utilizing the following equation to ensure assigning the minimum of the flow:

$$k^* = \operatorname*{argmin}_k \sum_l g_r^k(l)\theta(l);$$

where $\theta(l)$ is a dual weight, k* is an intermediate node, and $g_r^k(l)$ is the flow that results on link l from request through intermediate node k.

Various exemplary embodiments are described wherein routing the demand further comprises: setting $$\pi(r) \leftarrow d(r)\left[1 - \sum_l g_r^{k^*}(l)\theta(l)\right]\pi(r)$$

is a dual variable, and d(r) is the units of bandwidth needed between nodes for request r; and setting for links e:

$$\theta(l) \leftarrow \theta(l)\left[1 + \frac{g_r^{k^*}(l)d(r)}{c(l)}\right] + \frac{1}{n(e-1)}\frac{g_r^{k^*}(l)d(r)}{c(l)},$$

where c(l) is a capacity, c of link l.

Various exemplary embodiments are described wherein, when the minimum weight path has a weight greater than one, then the demand is rejected.

Various exemplary embodiments are described wherein, when the minimum weight path has a weight greater than one, then the demand is rejected. A device for online segment routing the device including: a memory; a processor configured to: initialize a link l's dual weight to zero for each arrival: determine the minimum weight two segment path from the ingress to egress for the demand; and when the minimum weight path has a weight less than or equal to one, route the demand along the minimum weight path.

Various exemplary embodiments are described wherein the processor is further configured to: assign the minimum of the flow on link £ when a request r is routed through intermediate node k.

Various exemplary embodiments are described wherein the processor is further configured to: ensure the minimum of the flow is dual feasible.

Various exemplary embodiments are described wherein the processor is further configured to: utilize the following equation to ensure assigning the minimum of the flow:

$$k^* = \operatorname*{argmin}_{k} \sum_{l} g_r^k(l)\theta(l);$$

where θ(l) is a dual weight, k* is an intermediate node, and $g_r^l(l)$ is the flow that results on link 1 from request through intermediate node k. The device, wherein the processor is further configured to: set $$\pi(r) \leftarrow d(r)\left[1 - \sum_{l} g_r^{k^*}(l)\theta(l)\right]\pi(r)$$

is a dual variable, and d(r) is the units of bandwidth needed between nodes for request r; and set for links e:

$$\theta(l) \leftarrow \theta(l)\left[1 + \frac{g_r^{k^*}(l)d(r)}{c(l)}\right] + \frac{1}{n(e-1)}\frac{g_r^{k^*}(l)d(r)}{c(l)},$$

where c(l) is a capacity, c of link l.

Various exemplary embodiments are described wherein, when the minimum weight path has a weight greater than one, then reject the demand.

Various exemplary embodiments are described wherein, when the minimum weight path has a weight greater than one, then reject the demand.

Various exemplary embodiments are described including a non-transitory machine-readable storage medium encoded with instructions for execution of a method of online segment routing, the medium including: instructions for initializing a link l's dual weight to zero for each arrival: instructions for determining the minimum weight two segment path from the ingress to egress for the demand; and when the minimum weight path has a weight less than or equal to one, route the demand along the minimum weight path.

Various exemplary embodiments are described including a non-transitory machine-readable storage medium wherein routing the demand further comprises: instructions for assigning the minimum of the flow on link l when a request r is routed through intermediate node k.

Various exemplary embodiments are described wherein routing the demand further comprises: instructions for ensuring the minimum of the flow is dual feasible.

Various exemplary embodiments are described wherein routing the demand further comprises: instructions for utilizing the following equation to ensure assigning the minimum of the flow:

$$k^* = \operatorname*{argmin}_{k} \sum_{l} g_r^k(l)\theta(l);$$

where θ(l) is a dual weight, k* is an intermediate node, and $g_r^k(l)$ is the flow that results on link 1 from request through intermediate node k.

Various exemplary embodiments are described wherein routing the demand further comprises: instructions for setting $$\pi(r) \leftarrow d(r)\left[1 - \sum_{l} g_r^{k^*}(l)\theta(l)\right]\pi(r)$$

is a dual variable, and d(r) is the units of bandwidth needed between nodes for request r; and instructions for setting for links e:

$$\theta(l) \leftarrow \theta(l)\left[1 + \frac{g_r^{k^*}(l)d(r)}{c(l)}\right] + \frac{1}{n(e-1)}\frac{g_r^{k^*}(l)d(r)}{c(l)},$$

where c(l) is a capacity, c of link l.

Various exemplary embodiments are described wherein, when the minimum weight path has a weight greater than one, then the demand is rejected.

Various exemplary embodiments are described including a non-transitory machine-readable storage medium wherein, when the minimum weight path has a weight greater than one, then the demand is rejected.

BRIEF DESCRIPTION OF THE DRAWINGS

In order to better understand various exemplary embodiments, reference is made to the accompanying drawings, wherein:

FIG. 6 illustrates an embodiment of an online segment routing algorithm;
FIG. 7 illustrates a method for traffic aware offline segment routing.
FIG. 8 illustrates a method for traffic oblivious offline segment routing.

To facilitate understanding, identical reference numerals have been used to designate elements having substantially the same or similar structure or substantially the same or similar function.

DETAILED DESCRIPTION

Figure 1:
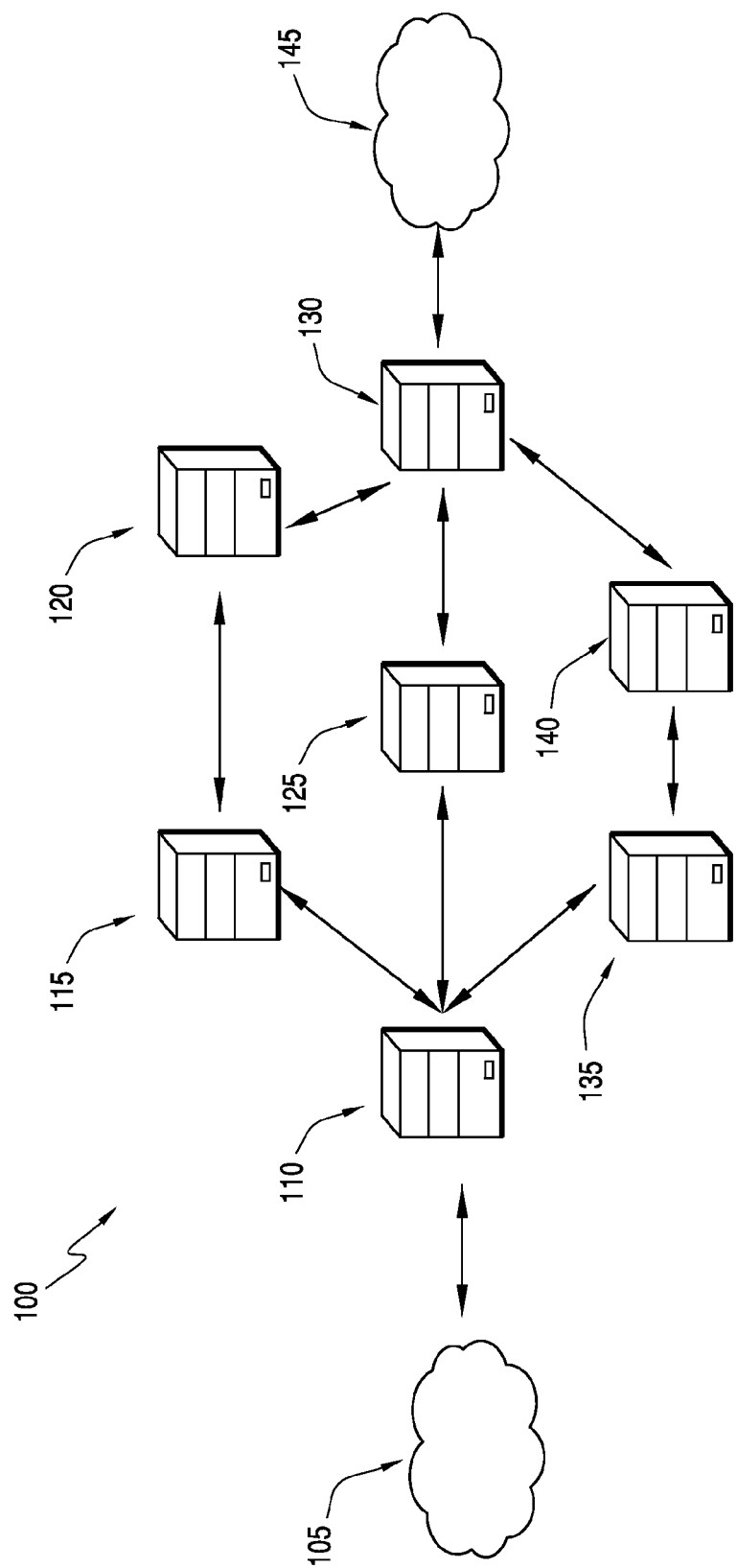
FIG. 1 illustrates an network environment.

Traditional routing in IP networks may be along shortest paths using link weight as the metric. It has been observed that under some traffic conditions, shortest path routing may lead to congestion on some links in the network while capacity may be available elsewhere in the network. The objective of traffic engineering includes ensuring that traffic may be managed such that network capacity may be utilized efficiently and in a balanced manner. There are several techniques for performing traffic engineering in IP networks including adjusting link weights based on traffic patterns, using Multiprotocol Label Switching (MPLS) to control routing paths and using centralized controllers like a Software Defined Network (SDN) controller to control traffic in a centralized manner.

A relatively new approach to traffic engineering is segment routing. One key idea in segment routing includes to break up the routing path into segments in order to better control routing paths, and hence improve network utilization. A segment may be essentially an MPLS label; traditional push, pop and swap actions may be applied by the routers on the path. There are two basic types of segments: a node and an adjacency. A node segment may identify a router node. Node segment Identifications (ID) may be globally unique across the domain. An adjacency segment may represent a local interface of a node. Adjacency segment IDs may typically be locally significant on each node. The MPLS data plane may be leveraged to implement segment routing, essentially without modification since the same label switching mechanism may be used. Segment labels are distributed across the network using simple extensions to current Interior Gateway Protocol (IGP) protocols and hence Label Distribution Protocol (LDP) and Resource Reservation Protocol-Traffic Engineering (RSVP-TE) are no longer required for distributing labels. As a result, the control plane may be significantly simplified. Moreover, unlike MPLS, there may be no need to maintain path state in segment routing except on the ingress node, since packets are now routed based on the list of segments they carry. The ingress node may be modified in order to determine the path and add the segment labels to the packet.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

FIG. 1 illustrates an exemplary network environment 100. As shown, the network environment 100 includes networks 105, and 145, connected to network equipment 110, 115, 120, 125, 130, 135, and 140. Network equipment 110, 115, 120, 125, 130, 135, and 140 may be a server, a data center, a blade, a desktop computer, or a node, for example of a data network. Networks 105, and 145 may be any kind of communication networks that are capable of facilitating inter-device communication. In various embodiments, the networks 105, and 145 include an IP/Ethernet network, a telecommunications network such as Public Land Mobile Network (PLMN), or a 3rd Generation Partnership Project protocol, and may include the Internet.

Each of network equipment 105-140 may be connected to an adjacent piece of network equipment 105-140 as pictured. It will be apparent that any configuration of network topology and sequence may be configured including, ring, mesh, star, full connected, bus, tree and line, for example. It will be apparent that fewer or additional pieces of network equipment may exist within exemplary network environment 100. In various exemplary embodiments, network equipment 105-140 may be geographically distributed; for example, network equipment 110, 125, and 130 may be located in Washington, D.C.; Seattle, Wash.; and Tokyo, Japan, respectively. Each piece of network equipment 105-140, may include hardware or software resources for networking including routing capabilities.

Figure 2:
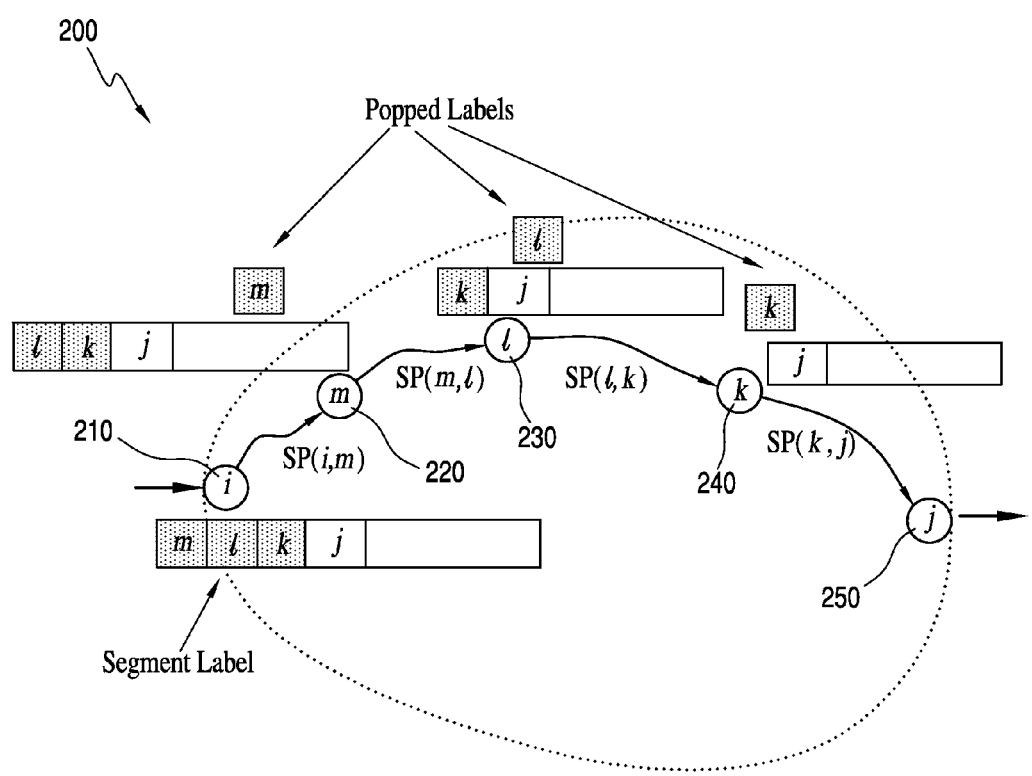
FIG. 2 illustrates an embodiment of segment routing.

FIG. 2 illustrates an exemplary embodiment of segment routing 200. In an embodiment of segment routing 200 the ingress node 210 may add a set of labels to IP header of the packet with the address of the end point 210, 220, 230, 240, 250 of each segment. These labels may be used as temporary destination addresses for the segment. The packet may then be routed using the standard shortest path routing algorithm. When the packet reaches the intermediate destination from the ingress, the top level label may be popped by the intermediate destination and now the packet may be routed from the intermediate node to the end point of the next segment again along the shortest path.

A segment routing path with k segment paths may be referred to as k-segment routing. If one permits an arbitrary number of segments, one may use arbitrary paths and therefore the problem of routing flows in an n-segment routed network may be viewed as solving a multi-commodity flow problem. This flexibility may come at the expense of increased label overhead and increased label processing in the network. From a traffic engineering point of view, most of the benefits of moving away from shortest path routing may be achieved using just two hops. One may show that 2-segment routing may be almost as good as solving the multi-commodity flow problem.

2-segment routing may be focused upon, where traffic between the ingress and egress passes through exactly one intermediate node. In other embodiments, segment routing with more than two segments may be utilized or accomplished. In the 2-segment routing problem, one key decision to be made by the control plane, may be how to pick the appropriate segments for each flow in order to minimize overall network congestion. One may consider three versions of this problem:

1) Traffic Matrix Aware Segment Routing: In this problem the traffic matrix may be assumed to be known and the objective may be to determine the traffic split across different segments for each source destination pair.

2) Traffic Matrix Oblivious Segment Routing: In this case, the traffic matrix may be not known in advance but the traffic splits may be designed such that it distributes traffic well for a wide range of traffic matrices.

3) Online Segment Routing: In this problem, connection requests arrive into the system one at a time and the segments are picked in order to keep the load balanced across the network.

The traffic matrix aware segment routing problem may serve as a benchmark for the more practical segment routing problems with unknown traffic matrices. The main difference between the traffic matrix oblivious segment routing and online segment routing may be that in the traffic matrix oblivious segment routing, the traffic split parameters are computed ahead of time and are set up once. There may be no need for online monitoring of link utilization. In the online segment routing problem, segments are chosen based on current link utilization and therefore there has to be continuous monitoring of link utilization in order to compute the segment for the current flow. The embodiments described herein provide:

Game theoretic like analysis of the segment routing problem results in the formulation of a linear program for solving the traffic matrix oblivious segment routing problem; and Competitive online algorithm for the online segment routing problem with provable worst case performance guarantee.

There may be some similarities of segment routing to pathlet routing, where fragments of end-to-end paths are exposed to help in routing. The resemblance to segment routing may be in the fact that segments may be viewed as path fragments. However the shortest path structure of the segments may lend itself well to modeling and optimization.

The network may be represented by a graph G=(N, E), where the nodes are the routers connected by directed links. Each link may have a weight w(e) and capacity c(e). One may assume that the network may not be symmetric. One may assume that the flows in the network are 2-segment routed. The terms segment routing and 2-segment routing may be used interchangeably herein. In the offline planning problem, instead of focusing on individual flows, one may focus on the aggregate traffic between source destination pairs.

Figure 3:
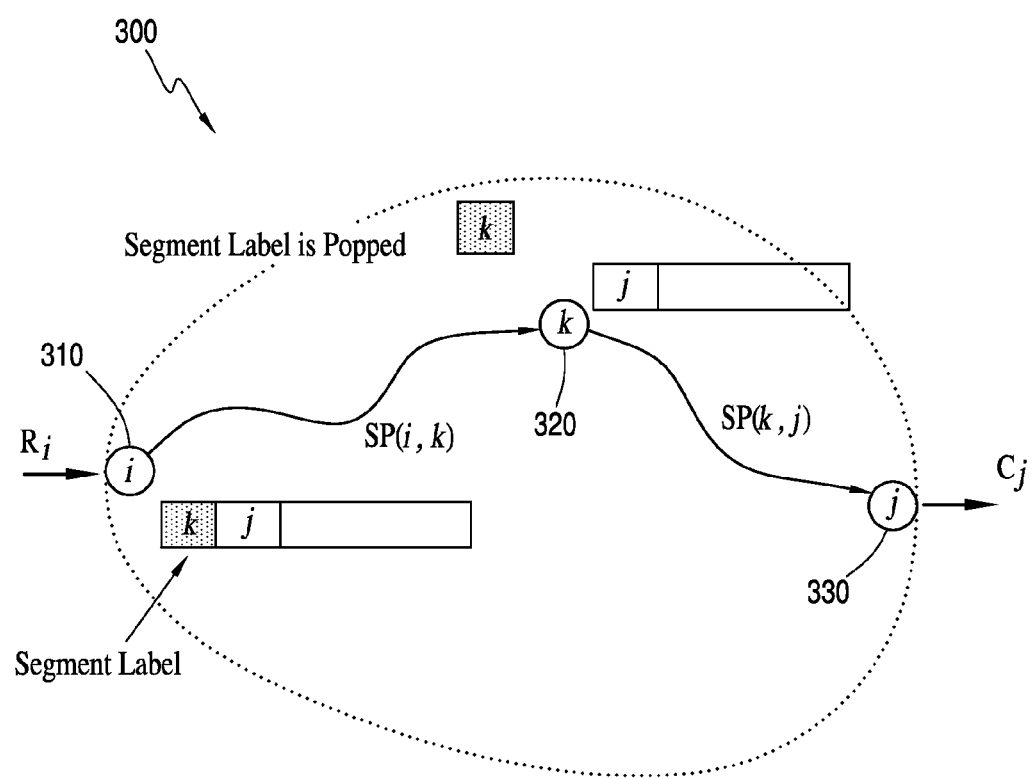
FIG. 3 illustrates an embodiment of 2-segment routing.

FIG. 3 illustrates an exemplary embodiment of 2-segment routing 300. The segmented network path 300 may include ingress node i 310, intermediate node k 320, and egress node j 330. The aggregate amount of traffic between nodes i and j may be denoted by $t_{ij}$. The value of $t_{ij}$ may be known to the segment routing planner in certain embodiments, while the traffic matrix may not be known in others. One may assume that this traffic $t_{ij}$ between nodes i and j may be split across multiple intermediate nodes k. One may assume that this split may be flow based. In other words, one may assume that the source node splits the traffic using a hashing scheme that ensures that all packets belonging to the same flow may be routed through the same intermediate node (thus maintaining packet ordering). Assume that the link weights are fixed and all routing may be along shortest paths using this link weight as the metric. Let SP(i, j) denote the set of links on the shortest path from i to j. Note that when there are multiple shortest paths between nodes, then the network may split traffic across these equal cost paths. When the size of individual flows may be small compared to the capacity between node pairs and there are a large number of flows in the network then the traffic may be assumed to be split (approximately) equally across these multiple shortest paths.

Figure 4:
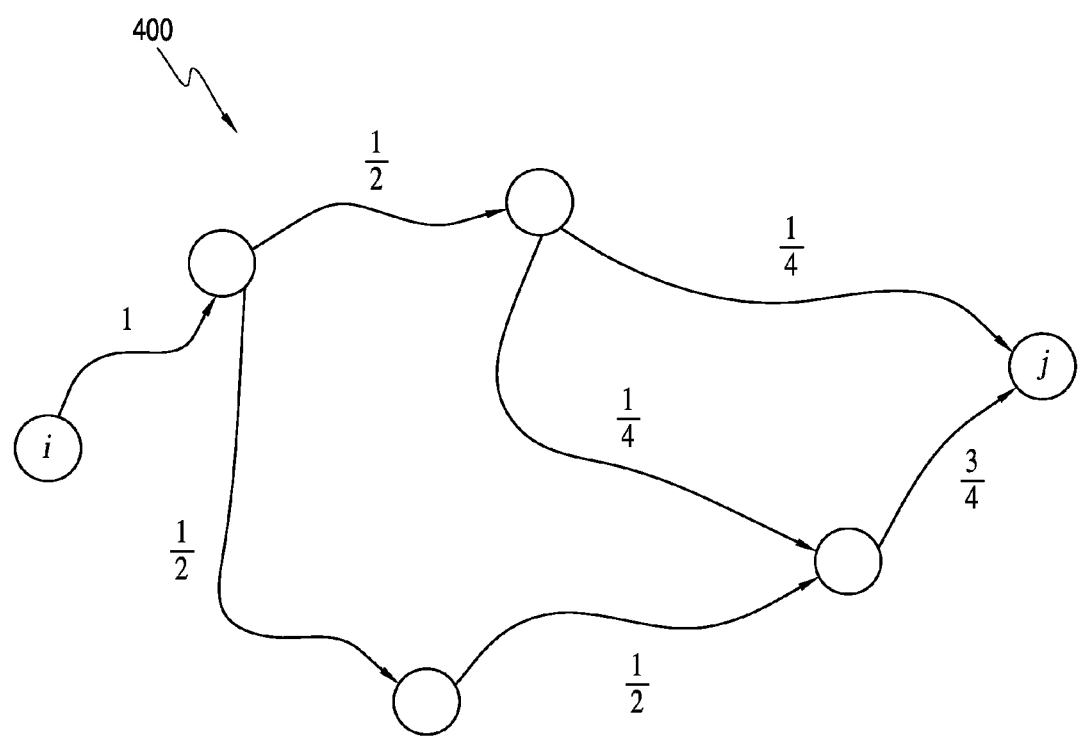
FIG. 4 illustrates an embodiment of fractional segment routing.

FIG. 4 illustrates an exemplary embodiment of fractional segment routing 400. Exemplary embodiment of fractional segment routing 400 includes fractional values $f_{ij}(e)$ with Equal Cost Multi-path (ECMP) routing. Links on some shortest paths are shown. The values shown on the path represent the $f_{ij}(e)$ for all links e on that section of the path.

Exemplary embodiment of fractional segment routing 400 shows how traffic may be split across equal cost paths from i to j. The fraction next to a sub-path represents the fraction of this unit flow that traverses all links in the sub-path. One may use $f_{ij}(e)$ to represent the flow on link e when unit flow may be routed from i to j. The value of $f_{ij}(e)$ may be a function of the network topology, link weights and the routing policy. When a single shortest path may be used to route traffic from i to j, the $f_{ij}(e)=1$ for all links e on the shortest path and $f_{ij}(e)=0$ if e may not be this shortest path. When ECMP is used, then $f_{ij}(e)$ may be fractional. Assume that a unit flow from node i to node j may be routed through k as the intermediate node. In this case, the flow on link e will be the sum of the flows from i to k and from k to j. One may define this fraction as:

$$g_{ij}^k(e) = f_{ij}(e) + f_{kj}(e).$$

Therefore, $g_{ij}^k(e)$ may be the flow that results on link e if a unit flow may be routed from i to j through intermediate node k. Note that routing on each segment may be along shortest paths. It may be easy to show that the value of $g_{ij}^k(e)$ may be computed efficiently for a given set of link weights. One may consider the problem of determining the optimal segment routing scheme when the traffic matrix may be given. Though the fact that the traffic matrix may be known may seem a little unrealistic, the traffic matrix aware segment routing problem provides the benchmark against which traffic matrix oblivious segment routing schemes may be measured.

When the traffic matrix may be given, then it may be determined how traffic should be segment routed. Let $t_{ij}$ denote the traffic between nodes i and j. Let $x_{ij}^k$ denote the amount of traffic between i and j that may be routed through node k. Recall that in 2-segment routing one just has to pick one intermediate node through which flow may be routed. Intermediate node k=i or k=j may represent the shortest path from i to j. If $x_{ij}^k$ amount of traffic may be routed from i to j through intermediate node k, then the amount of this flow that traverses link e may be $g_{ij}^k(e) x_{ij}^k$. The total flow on link e may then be $\Sigma_{ij}\Sigma_k g_{ij}^k(e) x_{ij}^k$.

A traffic matrix $[t_{ij}]$ may be defined to be 2-Segment Routeable when there exists $x_{ij}^k \geq 0$ for all (i, j) that satisfies the following constraints:

$$\sum_k x_{ij}^k = t_{ij} \quad \forall\, (ij) \qquad (1)$$

$$\sum_{ij}\sum_k g_{ij}^k(e) x_{ij}^k \leq c(e) \quad \forall\, e \qquad (2)$$

Equation (1) may ensure that all the traffic between nodes i and j may be routed in the network. Equation (2) constrains the flow on link e to be not greater than the capacity of link e. The set of segment routable matrices may be denoted by $SR_2$.

Since the number of links in the min weight path between any two nodes has not more than n links, the set of n-segment routable traffic matrices represent the set of traffic matrices that may be routed on the network using arbitrary paths. In other words, these are the traffic matrices that may be routed on the network (without violating link capacities) by solving the multi-commodity flow problem. Let $p_{ij}$ denote the set of paths between nodes i and j and P denote a generic path.

A traffic matrix $[t_{ij}]$ may be defined to be n-Segment Routable if there exists $x(P) \geq 0$ corresponding to path P such that $$\sum_{P \in P_{ij}} x(P) = t_{ij} \quad \forall\, (ij) \qquad (3)$$

$$\sum_{P: e \in P} x(P) \leq c(e) \quad \forall\, e. \qquad (4)$$

Equation (3) may ensure that all traffic is routed and Equation (4) ensures that no link capacity may be exceeded. The set of routable matrices will be denoted by $SR_n$. From the definitions, note that $SR_2 \subseteq SR_n$. The problem of determining a 2-segment routing that minimizes the maximum link utilization for a given traffic matrix may be formulated as the following linear program. The variable $\theta$ represents the maximum link utilization.

$$\min \theta$$

$$\sum_k x_{ij}^k \geq t_{ij} \quad \forall\, (ij)$$

$$\sum_{ij} \sum_{k} g_{ij}^{k}(e) x_{ij}^{k} \le c(e) \quad \forall\, e$$

$$x_{ij}^{k} \ge 0 \quad \forall\, (ij)$$

One may solve this linear program or use a combinatorial primal-dual algorithm along the approach in, N. Garg, and J. Konemann, "Faster and Simpler Algorithms for Multicommodity Flow and other Fractional Packing Problems," SIAM Journal on Computing, 37(2):630-652, 2007, incorporated herein by reference.

The traffic pattern in a network may vary widely over time and may not be easy to estimate accurately. Therefore, there may be need for developing techniques for setting segment routing parameters in a manner that works well for a wide range of traffic matrices. One embodiment to solve this problem may be to consider a group of traffic matrices and then use some heuristic to derive the segment routing parameters. An alternate embodiment may be to develop techniques where the segment routing parameters are chosen in a traffic matrix oblivious manner. One may use a rigorous approach based on game theoretic techniques to derive a traffic matrix oblivious segment routing mechanism. This adversarial approach may be part of the game theoretic literature and its use in networking may be initiated for deriving routing parameters for Racke's oblivious routing scheme. The adversarial approach may work well for the traffic oblivious 2-Segment routing problem and the resulting linear programs may be relatively easy to solve. Alternative approaches that optimizes network performance for expected traffic matrices while bounding the worst case performance may be used for segment routing.

Instead of using flow variables, the main set of variables that one may use is the fraction of traffic for each source destination pair that may be routed through a given intermediate node. More specifically, let $\alpha_{ij}^{k}$ represent the fraction of traffic from i to j that may be routed through intermediate node k. Since all traffic has to be routed we have $\Sigma_{k}\alpha_{ij}^{k}=1$ for all (i, j) pairs. The set of $\alpha_{ij}^{k}$ may be called the traffic split variables. The traffic split variables may be picked independent of the traffic matrix.

Figure 5:
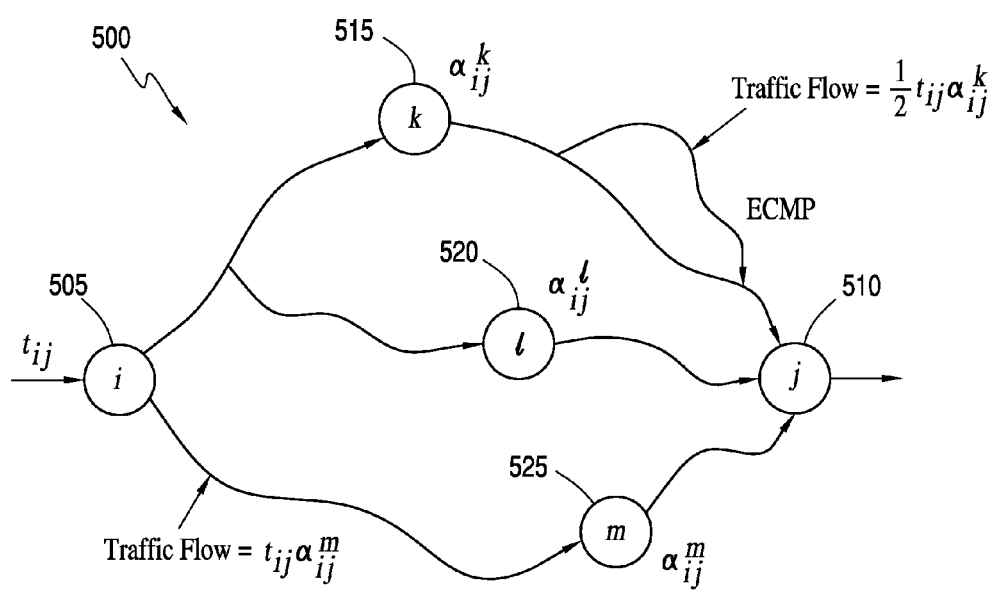
FIG. 5 illustrates an embodiment of traffic oblivious segment routing.

FIG. 5 illustrates an embodiment of traffic oblivious segment routing 500. FIG. 5 shows the traffic split variables as well as the actual traffic on a couple of links due to a traffic flow of $t_{ij}$ between nodes i 505 and j 510. The amount of traffic between nodes i 505 and j 510 that flows on link e may be $g_{ij}^{k}(e)\alpha_{ij}^{k}t_{ij}$. The first term $g_{ij}^{k}(e)$ represents the fraction of traffic that flows on link e if one unit of flow may be sent from source i to destination j through intermediate node k 515. Note that $\alpha_{ij}^{k}t_{ij}$ represents the total amount of flow from i to j that may be sent through intermediate node k 515. Simlar calculations may be applied using intermediate node l 520 or intermediate node m 525. Therefore, the total amount of traffic flowing on the link may be a function of the topology and link weights (through $g_{ij}^{k}(e)$) as well as the splitting factors and the traffic matrix. Note that the only variable that one may set are the $\alpha_{ij}^{k}$ values. Once the values of $\alpha_{ij}^{k}$ have been picked, as described below, one may set up a hash table at each ingress node i corresponding to each egress node j as follows: Assume that one has a uniform hash function that takes the flow id and maps to an n array. One may assume that $\lfloor aij^{k}\, n \rfloor$ of these n array returns k. If one assumes uniform hashing, the probability that k may be returned as approximately $\alpha_{ij}^{k}$. By choosing a suitably large value of n, the achieved probability may be made as close as one wants, to $\alpha_{ij}^{k}$. One may assume that there are a large number of flows between each node pair and the flow size may be small compared to the total available capacity. In this case, if $t_{ij}$ may be the total traffic (bits/second) between nodes i and j, then the mean traffic between i and j that goes through node k will be $\alpha_{ij}^{k}\, t_{ij}$. When a new flow arrives at node i, its destination j may be first determined. The flow id may be hashed into the hash table corresponding to egress node j and this returns the intermediate node k through which the flow may be routed. Label k may be prepended to the packet header and the flow may be routed from i to k. Once the intermediate node for a flow is picked, all subsequent packets for the flow will use the same intermediate node. Once the packet reaches node k, the header may be popped and the packet may be routed from k to j.

One may now consider optimally picking the traffic split variables. One may want to pick traffic split variables that works well for any 2-segment routable traffic matrix. When computing two algorithms A, and B one may use:

$$\eta(A, B) = \max_{T \in F(B)} \rho(A, T).$$

To measure the performance of A relative to B. For a given traffic matrix T, the ratio represents the ratio of maximum link load realized by algorithm A to the maximum link load realized by B. The value of $\eta(A, B)$ is the ratio of the link loads for the worst case traffic matrix. The link load for any algorithm may be a linear function of the traffic matrix.

Let the traffic oblivious 2-segment routing algorithm be A and the traffic aware 2-segment routing algorithm be B. We now consider a link e' and consider the maximum load on link e' due to some traffic matrix in F(B). Note that $F(B)=SR_2$ may be the set of all 2-segment routable traffic matrices. Assume that an adversary wants to pick a traffic matrix from $SR_2$ that maximizes the load on link e'. This may be formulated as the following optimization problem:

$$\max \sum_{ij} \sum_{k} g_{ij}^{k}(e') \alpha_{ij}^{k} t_{ij}$$

$$t_{ij} - \sum_{k} x_{ij}^{k} = 0 \quad \forall\, (ij)$$

$$\sum_{ij} \sum_{k} g_{ij}^{k}(e) x_{ij}^{k} \le c(e) \quad \forall\, e$$

$$x_{ij}^{k} \ge 0 \quad \forall\, (ij)$$

The objective function is the flow on link e' if the split variables are $\alpha_{ij}^{k}$, and the traffic between i and j is $t_{ij}$. The variables in the linear program are the traffic matrix values $t_{ij}$. The value $\alpha_{ij}^{k}$ may be independent of the traffic matrix, and may therefore be treated as a constant in this linear program. The $t_{ij}^{k}$ may be eliminated from the linear program resulting in the following:

$$\max \sum_{ij} \left[ \sum_{k} g_{ij}^{k}(e') \alpha_{ij}^{k} \right] \sum_{m} x_{ij}^{m}$$

$$\sum_{ij} \sum_{k} g_{ij}^{k}(e) x_{ij}^{k} \le c(e) \quad \forall\, e$$

$$x_{ij}^{k} \ge 0 \quad \forall\, (ij)$$

Associating a dual variable $\pi(e,e')$ with constraint corresponding to link e, one may write the dual to the above linear program as $$\min \sum_e c(e)\pi(e, e')$$

$$\sum_e g_{ij}^m(e)\pi(e, e') \geq \sum_k g_{ij}^k(e')\alpha_{ij}^k \quad \forall\, (ij)\, \forall\, e'\, \forall\, m$$

$$\pi(e, e') \geq 0 \quad \forall\, e, e'.$$

Let θ be the maximum link utilization. (One may want to minimize θ). One may want the solution of the primal linear program to be less than θc(e'). By strong duality, the optimal solution to the primal and dual are the same and therefore one may want $\Sigma_e c(e)\pi(e,e') \leq \theta c(e')$ if the maximum link utilization of e' is preferred to be less that θ. Therefore the system of inequalities $$\sum_e g_{ij}^m(e)\pi(e, e') \geq \sum_k g_{ij}^k(e')\alpha_{ij}^k \quad \forall\, (ij)\, \forall\, e'\, \forall\, m$$

$$\sum_e c(e)\pi(e, e') \leq \theta c(e') \quad \forall\, e'$$

$$\pi(e, e') \geq 0 \quad \forall\, e, e'$$

represents the set of conditions that $\alpha_{ij}^k$ has to satisfy if one may want the utilization of link e' to be less than θ for any traffic matrix in $SR_2$. One may write one set of inequalities for each link e' along with the condition $\Sigma_k \alpha_{ij}^k = 1$ for all i, j to formulate the problem of determining the traffic split values to minimize the worst case link utilization as Minimize θ

$$\sum_e g_{ij}^m(e)\pi(e, e') \geq \sum_k g_{ij}^k(e')\alpha_{ij}^k \quad \forall\, (ij)\, \forall\, e'\, \forall\, m$$

$$\sum_e c(e)\pi(e, e') \leq \theta\, c(e') \quad \forall\, e'$$

$$\sum_k \alpha_{ij}^k = 1 \quad \forall\, (ij)$$

$$\alpha_{ij}^k, \pi(e, e') \geq 0 \quad \forall\, (ij)\forall\, e, e'.$$

The objective of the linear program may be to minimize the maximum link utilization over all traffic matrices in $SR_2$. Note that this linear program has $O(n^3 m)$ constraints and $O(n^3 + m^2)$ variables. The variables in the linear program are $\alpha_{ij}^k$ for all node triplets i, j, k and π(e, e') for all link pairs e,e'. One may solve this linear program using the GNU's not Unix Linear Programming (GNU LP) solver to derive the optimal traffic matrix oblivious traffic split values. When there may be a centralized Path Computation Engine (PCE) that routes every request, and if requests arrive one at time then, one may may develop an online approach that may use the current network state to segment route traffic.

When a network has a centralized controller like a Path Computation Engine (PCE) or a Software Defined Network (SDN) controller that processes every flow arrival and computes a segment routed path for the arrival, then this centralized controller may use an online approach to solve the segment routing problem. In the online approach, knowledge of the current network state, or all the link loads may be assumed. Similarly, knowledge of future arrivals may not be assumed. The objective of the online routing algorithm may be to reject as few requests as possible. The performance of the online algorithm may be compared to the best offline algorithm with knowledge of requests ahead of time. Online algorithms may be derived with guaranteed worst case performance as shown.

In some embodiments, a network setup may be the same as in the traffic oblivious routing problem. A main difference may be the way requests arrive into the system.

In online segment routing, requests may arrive to the PCE, or SDN controller, one at a time. Request r may prefer d(r) units of bandwidth between nodes s(r) and t(r). When request r is accepted, it may be segment routed from s(r) to t(r) and there may be a "profit" of d(r). In some embodiments, an assumption that s(r),t(r) and d(r) are known at the request arrival may be made. The PCE may determine the 'best" intermediate node k to route this request. Routing may be along shortest paths. An assumption that ECMP may be used as well as the smallest non-zero value of $g_{ij}^k(e) \geq B$ for some constant B. The implication of this assumption may be that the flows between source and destination are not split because of ECMP into too many small streams. This assumption may generally hold in practice and may be important to prove the competitive ratio of the online algorithm. Once a request is accepted into the system, it stays in the system permanently. This assumption may be necessary to prove the theoretical results but this assumption may be relaxed while performing experimental studies. An assumption may be made that when the request is rejected, then the system accumulates zero profit. The objective of the system may be to maximize the total profit. If all the requests are known ahead of time, then an integer programming problem may be formulated to maximize the total profit.

Let R denote the set of requests and r denote a specific request. An assumption may be made that the link weights have been specified, and Let $X_r^k = 1$ if request r may be 2-segment routed through intermediate node k. If $X_r^k = 1$, then the flow on link l will be $g_{s(r)t(r)}^k(l)d(r)$. In order to keep the notation simple the following short-hand may be used:

$$g_r^k(l) = g_{s(r)t(r)}^k(l).$$

Using this shorthand notation, the flow on link e when request r may be routed through intermediate node k may be $g_r^k(l)d(r)$. A linear program may be defined as follows.

$$\max \sum_{r \in R} d(r) \sum_k X_r^k$$

$$\sum_k X_r^k \leq 1 \quad \forall\, r \tag{5}$$

$$\sum_{r \in R} g_r^k(e) X_r^k \leq c(l) \quad \forall\, l \tag{6}$$

$$X_r^k \geq 0 \quad \forall\, r, k. \tag{7}$$

Consider the linear programming relaxation of the above problem where one may set $0 \leq X_r^k \leq 1$. The upper bound $X_r^k \leq 1$ may be implied by Equation (5) and may therefore be eliminated from the formulation. The dual to the above linear programming relaxation may now be written as:

$$\min \sum_r \pi(r) + \sum_l c(l)\theta(l)$$

$$\pi(r) \geq d(r)\left[1 - \sum_l g_r^k(l)\theta(l)\right] \quad \forall\, k\, \forall\, r \tag{8}$$

$$\pi(r), \delta(l) \geq 0. \tag{9}$$

From Equation (8), one may set $$\pi(r) = \max_k d(r)\left[1 - \sum_l g_r^k(l)\theta(l)\right] \forall r. \quad (10)$$

The offline segment routing problem may not be solved in practice since the requests may not be known ahead of time. The above primal and dual problems may be used to develop an online algorithm. The design of this algorithm may be the approach outlined in N. Buchbinder, J. Naor, "Online Primal-Dual Algorithms for Covering and Packing Problems", 13th Annual European symposium on Algorithms, (2005) and/or N. Buchbinder, J. Naor, "A Primal-Dual Approach to Online Routing and Packing", 47th IEEE Foundations on Computer Science, (2006), which are incorporated herein by reference.

Let $Z^*$ denote the optimal solution to the linear programming problem. This may be the maximum traffic that may be routed by the offline algorithm without exceeding any capacity constraints. Let $Z_{ON}$ represent the solution obtained by the online algorithm. Note that $Z_{ON} \leq Z^*$ since the online algorithm may at best match the offline optimal solution. One may say that the online algorithm may be $\beta$-competitive if there exists $\beta \leq 1$ such that $$Z_{ON} \geq \beta Z^*$$

for all possible inputs. In general, one would like to get a competitive ratio that may be close to 1. This may be possible in the case of some simple online optimization problems. For the more complex problems like the online segment routing problem, one may show that a constant factor competitive algorithm may be not possible. Instead one may define the notion of $[c_1, c_2]$ competitive algorithm such as in "Online Primal-Dual Algorithms for Covering and Packing Problems" mentioned above.

An online algorithm may be defined as $[c_1, c_2]$-competitive if the online algorithm achieves routes at least $c_1 \leq 1$ of the optimum offline solution while ensuring that the utilization of any link does not exceed $c_2 \geq 1$.

For example an online algorithm may be [0.5,log n] competitive when the online algorithm gets at least 0.5 of the revenue of the offline algorithm while none of the links flows exceed log n of the link capacity. One ideally wants few to none of the link capacities to be exceeded. For many difficult online optimization problems, this logarithmic capacity violation may be the best possible guaranteed bound. One way of getting around this excess utilization may be to scale down the capacities by log n so that the capacity will not be exceeded. The algorithm may be modified as discussed below.

FIG. 6 illustrates an embodiment of an online segment routing algorithm 600. Link l may have a dual weight $\theta(l)$ which may be initialized to zero. The $\pi(r)$ values may be used in the analysis of the algorithm. At each arrival, the minimum weight 2-segment path from the ingress to egress for the demand may be found. Link l may be weighted with the $g_{ij}^k(l)$ values. The routing for each segment may be along minimum weight path according to the link weight metric. When the minimum weight path has a weight greater than one, then the demand may be rejected. Otherwise, the demand may be routed along this minimum weight path and the dual weights of all the links on this path may be increased according to Equation (11). l denotes a generic link.

To adapt the algorithm for use in realistic settings, a heuristic based on the analysis of the algorithm may be used. Requests may arrive as well as leave the system, and therefore the system may account for request departures. Note that $$\theta(l, r) \geq \frac{1}{n} \frac{e^{\rho(e,r)} - 1}{e - 1}.$$

At any given point, the controller may track the total amount of flow F(l) on link l. One may set:

$$\theta(l) = \frac{1}{n} \frac{e^{\frac{F(l)}{c(l)}} - 1}{e - 1}$$

or more generally make the weight of the link an exponential function of the link utilization, i.e., $$\theta(l) = e^{\frac{F(l)}{c(l)}}.$$

The value of $\theta(l)$ may be updated whenever any flow either enters or leaves the system.

FIG. 7 illustrates an exemplary method for traffic aware offline segment routing 700. Network equipment 110, for example, may implement exemplary method for traffic aware offline segment routing 700. Network equipment 110 may begin in step 705 and proceed to step 710 where network equipment 110 may define any of several variables used for matrix aware offline solutions of segment routing.

In some embodiments network equipment 110 may define, $$\sum_k x_{ij}^k \geq t_{ij} \ \forall (i,j),$$

$$\sum_{ij} \sum_k g_{ij}^k(e) x_{ij}^k \leq \theta \, c(e) \ \forall e,$$

and $x_{ij}^k \geq 0 \ \forall (i,j)$ where $t_{ij}$ may denote the traffic between nodes i and j, $x_{ij}^k$ may denote the amount of traffic between i and j that may be routed through node k, $g_{ij}^k(e)$ is the flow that results on link e if a unit flow may be routed from i to j through intermediate node k, c(e) is the capacity of link e, and theta is the maximum link utilization.

Network equipment 110 may proceed to step 715 where it may use linear programming to iterate linearly through the variables.

Network equipment 110 may proceed to step 720 where it may minimize theta using the linear programming.

Network equipment 110 may proceed to step 725 where it may stop.

FIG. 8 illustrates an exemplary method for traffic oblivious offline segment routing 800. Network equipment 110, for example, may implement exemplary method for traffic oblivious offline segment routing 800. Network equipment 110 may begin in step 805 and proceed to step 810 where network equipment 110 may define any of several variables used for matrix unaware offline solutions of segment routing.

In some embodiments network equipment 110 may define, $$\sum_e g_{ij}^m(e)\pi(e, e') \geq \sum_k g_{ij}^k(e')\alpha_{ij}^k \ \forall \ (ij) \ \forall \ e' \ \forall \ m;$$

$$\sum_e c(e)\pi(e, e') \leq \theta \ c(e') \ \forall \ e';$$

$$\sum_k \alpha_{ij}^k = 1 \ \forall \ (ij); \text{ and}$$

$$\alpha_{ij}^k, \pi(e, e') \geq 0 \ \forall \ (ij) \forall \ e, e',$$

where a link e and e' are utilized in dual variable $\pi(e,e')$, g indicates the amount of traffic between a node i and a node j that flows on link e' through intermediate node k, and $\alpha_{ij}^k$ is the fraction of traffic from i to j that is routed through intermediate node k.

Network equipment 110 may proceed to step 815 where it may use linear programming to iterate linearly through the variables. Network equipment 110 may proceed to step 820 where it may minimize theta using linear programming. Network equipment 110 may then proceed to step 825 where it may stop.

Figure 9:
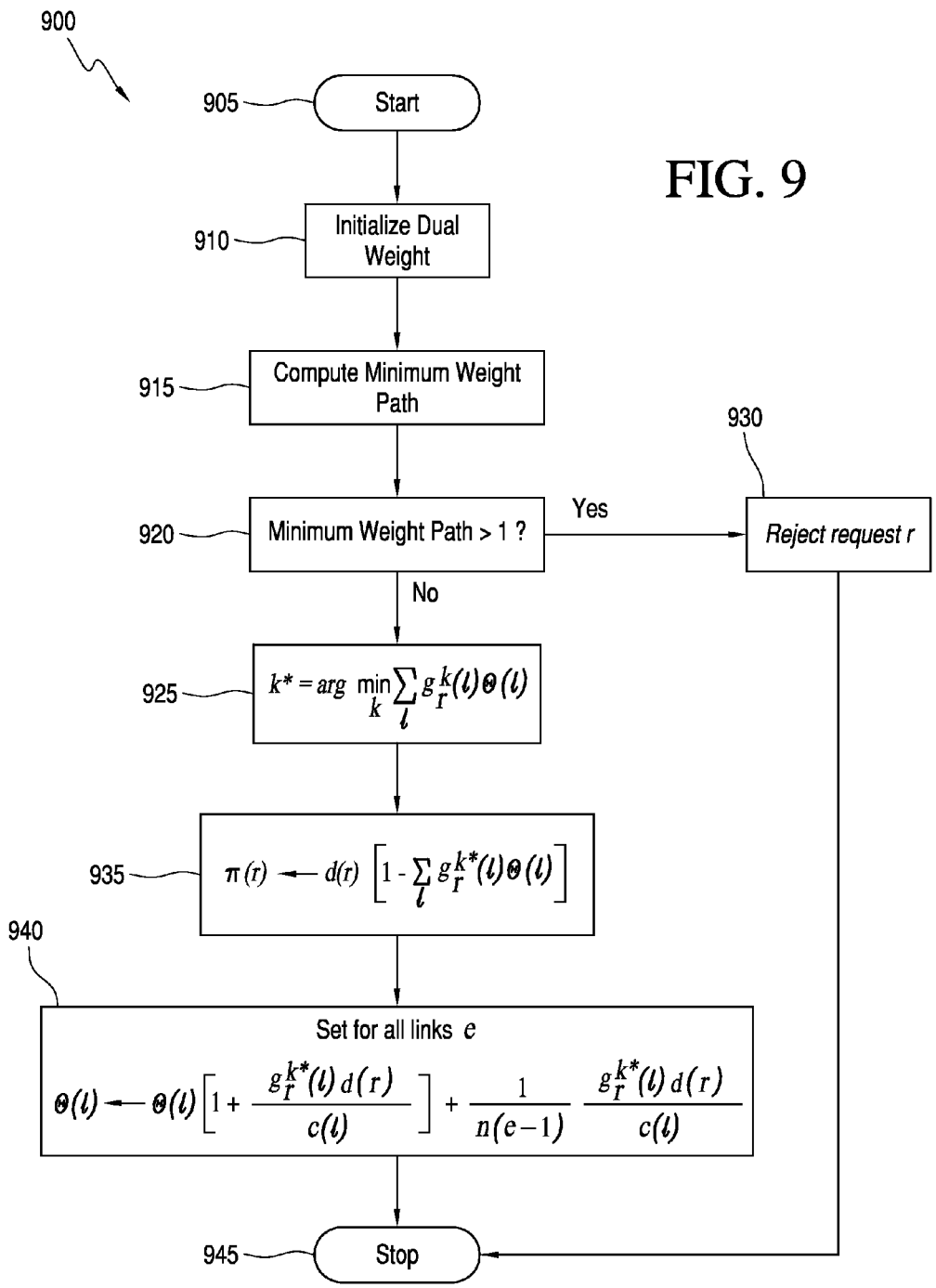
FIG. 9 illustrates a method for online segment routing.

FIG. 9 illustrates an exemplary method for online segment routing 900. Network equipment 110, for example, may implement exemplary method for online segment routing 900. Network equipment 110 may begin in step 905 and proceed to step 910 where it may initialize a link l's dual weight, $\theta(l)$ to zero.

Network equipment 110 may proceed to step 915 where for each arrival, r it may determine the minimum weight two segment path from the ingress to egress for the demand. To determine this network equipment 110 may use the equation $V = \min_k \sum_l g_r^k(l)\theta(l)$ where $g_r^k(l)$ is the flow that results on link l from a request through intermediate node k for minimum weight path V.

Network equipment 110 may proceed to step 920 where it may determine if the minimum weight path is greater than 1. When the minimum weight path is greater than 1, network equipment 110 may proceed to step 930 where it may reject the request and cease operation. When the minimum weight path is less than or equal to 1 then network equipment 110 may proceed to stop 925 where it may accept the demand.

In step 925, network equipment 110 may ensure the minimum of the flow is dual feasible. Network equipment 110 may ensure the minimum of the flow is dual feasible by utilizing the following equation $$k^* = \arg\min_k \sum_l g_r^k(l)\theta(l)$$

where, k* is an intermediate node.

Network equipment 110 may proceed to step 935 where it may set $\pi(r)$ to $$d(r)\left[1 - \sum_l g_r^{k^*}(l)\theta(l)\right]$$

where $\pi(r)$ is a dual variable, and d(r) is the units of bandwidth needed between nodes for request r.

Network equipment 110 may proceed to step to step 940 where it may set for all links e, $$\theta(l) \leftarrow \theta(l)\left[1 + \frac{g_r^{k^*}(l)d(r)}{c(l)}\right] + \frac{1}{n(e-1)}\frac{g_r^{k^*}(l)d(r)}{c(l)}$$

where c(l) is a capacity, c of link l.

Network equipment 110 may proceed to step to step 945 where it may stop.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor may be explicitly shown.

Although the various exemplary embodiments have been described in detail with particular reference to certain exemplary aspects thereof, it should be understood that the invention may be capable of other embodiments and its details are capable of modifications in various obvious respects. As may be readily apparent to those skilled in the art, variations and modifications may be affected while remaining within the spirit and scope of the invention. Accordingly, the foregoing disclosure, description, and figures are for illustrative purposes only and do not in any way limit the invention, which may be defined only by the claims.

What is claimed is:

1. A method of offline traffic matrix aware segment routing comprising:
    receiving a traffic matrix based upon all the traffic between a node i and a node j that is routed in a network; and
    determining the amount of traffic between the node i and the node j that will be routed through a node k, based on minimizing a maximum link utilization for a set of links.

2. The method of claim 1, wherein minimizing the link utilization further comprises:
    constraining the amount of traffic between the node i and the node j that may be routed through the node k to be positive.

3. The method of claim 2, wherein minimizing the link utilization further comprises:

constraining the total amount of traffic through the node k between the node i and the node j to be equal to or greater than the traffic between the node i and the node j.

4. The method of claim 3, wherein minimizing the link utilization further comprises:
constraining the sum of the flow that results on a link e to be less than the maximum link utilization multiplied by the capacity of the link e.

5. The method of claim 1, further comprising:
using a linear program to minimize the maximum link utilization for the traffic matrix, wherein:
the sum of traffic between the node i and the node j that may be routed through the node k is more than or equal to the traffic between the node i and the node j;
the sum of the flow that results on a link e is less than the maximum link utilization multiplied by the capacity of the link e; and
the amount of traffic between the node i and the node j that may be routed through the node k is positive.

6. The method of claim 5, wherein the linear program minimizes theta for the following set of equations:

$$\sum_k x_{ij}^k \geq t_{ij} \; \forall \; (ij);$$

$$\sum_{ij} \sum_k g_{ij}^k(e) x_{ij}^k \leq \theta \; c(e) \; \forall \; e;$$

$$x_{ij}^k \geq 0 \; \forall \; (ij);$$

where $t_{ij}$ denotes the traffic between the node i and the node j, $x_{ij}^k$ denotes the amount of traffic between the node i and the node j that may be routed through the node k, $g_{ij}^k(e)$ denotes the flow that results on the link e if a unit flow may be routed from the node i and the node j through the node k, $c(e)$ denotes the capacity of the link e, theta denotes the maximum link utilization.

7. The method of claim 1, further comprising:
determining that the total amount of flow on a link e in the network is less than the link e's capacity.

8. A device for offline traffic matrix aware segment routing, the device comprising:
a memory; and
a processor configured to:
receive a traffic matrix based upon all the traffic between a node i and a node j that is routed in a network; and
determine the amount of traffic between the node i and the node j that will be routed through a node k, based on a minimization of a maximum link utilization for a set of links.

9. The device of claim 8, wherein minimizing the link utilization further comprises:
constraining the amount of traffic between the node i and the node j that may be routed through the node k to be positive.

10. The device of claim 9, wherein minimizing the link utilization further comprises:
constraining the total amount of traffic through the node k between the node i and the node j to be equal to or greater than the traffic between the node i and the node j.

11. The device of claim 10, wherein minimizing the link utilization further comprises:
constraining the sum of the flow that results on a link e to be less than the maximum link utilization multiplied by the capacity of the link e.

12. The device of claim 8, further comprising:
using a linear program to minimize the maximum link utilization for the traffic matrix, wherein:
the sum of traffic between the node i and the node j that may be routed through the node k is more than or equal to the traffic between the node i and the node j;
the sum of the flow that results on a link e is less than the maximum link utilization multiplied by the capacity of the link e; and
the amount of traffic between the node i and the node j that may be routed through the node k is positive.

13. The device of claim 11, wherein the linear program minimizes theta for the following set of equations:

$$\sum_k x_{ij}^k \geq t_{ij} \; \forall \; (ij);$$

$$\sum_{ij} \sum_k g_{ij}^k(e) x_{ij}^k \leq \theta \; c(e) \; \forall \; e;$$

$$x_{ij}^k \geq 0 \; \forall \; (ij);$$

where $t_{ij}$ denotes the traffic between the node i and the node j, $x_{ij}^k$ denotes the amount of traffic between the node i and the node j that may be routed through the node k, $g_{ij}^k(e)$ denotes the flow that results on the link e if a unit flow may be routed from the node i and the node j through the node k, $c(e)$ denotes the capacity of the link e, theta denotes the maximum link utilization.

14. The device of claim 8, wherein the processor is further configured to determine that the total amount of flow on a link e in the network is less than the link e's capacity.

15. A non-transitory machine-readable storage medium encoded with instructions for execution of a method of offline traffic matrix aware segment routing, the medium comprising:
instructions for receiving a traffic matrix based upon all the traffic between a node i and a node j that is routed in a network; and
instructions for determining the amount of traffic between the node i and the node j that will be routed through a node k, based on minimizing a maximum link utilization for a set of links.

16. The non-transitory machine-readable storage medium of claim 15, wherein minimizing the link utilization further comprises:
constraining the amount of traffic between the node i and the node j that may be routed through the node k to be positive.

17. The non-transitory machine-readable storage medium of claim 16, wherein minimizing the link utilization further comprises:
constraining the total amount of traffic through the node k between the node i and the node j to be equal to or greater than the traffic between the node i and the node j.

18. The non-transitory machine-readable storage medium of claim 17, wherein minimizing the link utilization further comprises:
constraining the sum of the flow that results on a link e to be less than the maximum link utilization multiplied by the capacity of the link e.

19. The non-transitory machine-readable storage medium of claim 15, further comprising:
instructions for using a linear program to minimize the maximum link utilization for the traffic matrix, wherein:
the sum of traffic between the node i and the node j that may be routed through the node k is more than or equal to the traffic between the node i and the node j;
the sum of the flow that results on a link e is less than the maximum link utilization multiplied by the capacity of the link e; and
the amount of traffic between the node i and the node j that may be routed through the node k is positive.

20. The non-transitory machine-readable storage medium of claim 19, wherein the linear program minimizes theta for the following set of equations:

$$\sum_{k} x_{ij}^{k} \geq t_{ij} \ \forall \ (ij);$$

$$\sum_{ij} \sum_{k} g_{ij}^{k}(e) x_{ij}^{k} \leq \theta \ c(e) \ \forall \ e;$$

$$x_{ij}^{k} \geq 0 \ \forall \ (ij);$$

where denotes the traffic between the node i and the node j, $x_{ij}^{k}$ denotes the amount of traffic between the node i and the node j that may be routed through the node k, $g_{ij}^{k}(e)$ denotes the flow that results on the link e if a unit flow may be routed from the node i and the node j through intermediate the node k, c(e) denotes the capacity of the link e, theta denotes the maximum link utilization.

21. The non-transitory machine-readable storage medium of claim 15, further comprising:
instructions for determining that the total amount of flow on a link e in the network is less than the link e's capacity.

* * * * *